Oct. 23, 1962 B. A. PROCTOR 3,059,933

ENDLESS BELT DRIVE AND TRACKING MEANS

Filed Feb. 23, 1960 2 Sheets-Sheet 1

INVENTOR.
BARTON A. PROCTOR

BY

Moses, Nolte & Nolte
ATTORNEYS

ENDLESS BELT DRIVE AND TRACKING MEANS

Filed Feb. 23, 1960 2 Sheets-Sheet 2

INVENTOR.
BARTON A. PROCTOR

BY

Moses, Nolte & Nolte
ATTORNEYS 3,059,933
Patented Oct. 23, 1962

3,059,933

ENDLESS BELT DRIVE AND TRACKING MEANS

Barton A. Proctor, Larchmont, N.Y., assignor of thirty-three and one-third percent to Albert C. Nolte, New York, N.Y.

Filed Feb. 23, 1960, Ser. No. 10,410
5 Claims. (Cl. 274—17)

This invention relates to improvements in sound recording and reproducing machines and particularly to adapting portions of existing disc type recording machines to use an endless magnetic recording belt.

More particularly the invention is concerned with the simple and economical conversion of recording machines similar to the type described in U.S. Letters Patent No. 2,628,842 issued February 17, 1953, to F. L. Moore et al. These machines incorporate a pair of opposed driving rollers which contact opposite sides of the record. As the record is angularly rotated by these driving rollers, the record center is moved transversely so that a recording groove is cut from the inside to the outside of the record. Machines of this type have the disadvantage that record costs are considerable and that the discs are not reusable to any great degree of satisfaction. The records are also rather large and bulky and are not mailable in regular letter sized envelopes. The quality of recordation produced by such machines is inferior to the quality obtainable by magnetic recorders. Recording machines have been developed which incorporate a magnetic tape wrapped upon a reel and these machines also have various disadvantages not found in the present invention. Reel type tape recorders usually require tedious tape threading operations and users of such machines find their operation complex for this reason.

Applicant's invention has the advantage over the prior art that a single endless belt of considerable width is employed. Easy threading upon the machine is possible and the belt may be mailed flat in an ordinary envelope.

An object of the invention is to provide an improved endless magnetic belt type recording machine wherein many common prior art disc type recorder parts are used.

Another object of the invention is to provide a magnetic recording and reproducing apparatus wherein an endless recording belt is rotatably driven while the reproducing head is translated across the width of the belt.

Still another object of the invention is to provide a recording machine wherein the recording head is easily shiftable in relation to the belt to any preselected lateral belt position without misalignment from the recorded channels.

Still another object of the invention is to provide a means for synchronizing the translational motion of the recording head with respect to linear travel of the belt.

A further object of the invention is to provide an improved magnetic belt recording and reproducing machine which is simple in design, neat in appearance, rugged in construction and economical to manufacture.

Other objects and advantages of the invention will become apparent and the invention will be fully understood from the following description and drawings in which.

Figure 1:
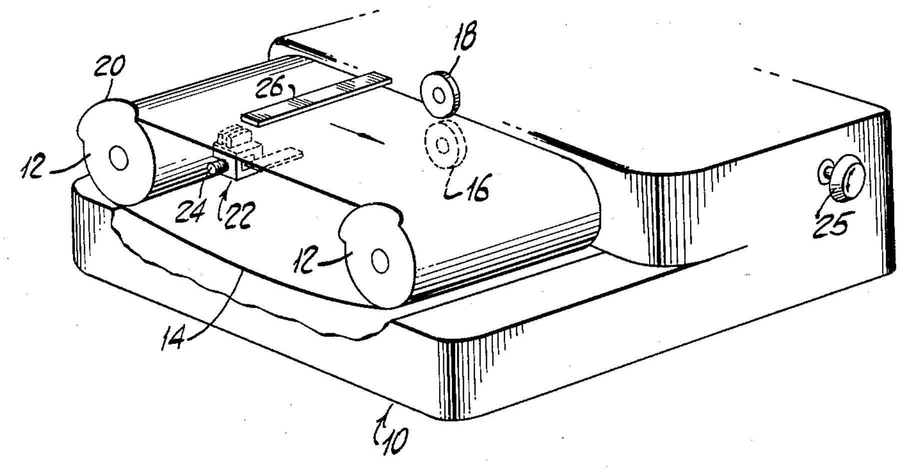
FIG. 1 is a partial perspective view of the invention.

Referring to the drawings, a magnetic belt recording and reproducing mechanism is shown which may readily be adapted to the prior art mechanism in the aforementioned Patent No. 2,628,842, which employs a circular record blank. This conversion of the prior art mechanism may be accomplished by using a minimum number of new parts as will be readily apparent from the following description.

In the present invention a dictating machine frame 10 carries a pair of spaced parallel belt supporting drums 12 around which is placed a wide endless magnetic belt or tape 14. This magnetic belt is adapted to be driven about the support drums 12 by a rotated lower power driven friction roller 16 which cooperates with a vertically movable upper idler friction roller 18. The support drum ends are provided with raised flange portions 20 to retain the belt. Surrounded by the endless belt 12 is a magnetic recording and reproducing head and carriage shown generally at 22, which is adapted to traverse across the width of the magnetic belt under the control of a rotating threaded shaft or lead screw 24. A control knob 25 upon the front of the machine frame 10 is connected through means not shown to quickly effectuate the desired lateral positioning of the recording head in a manner to be described hereafter.

Figure 2:
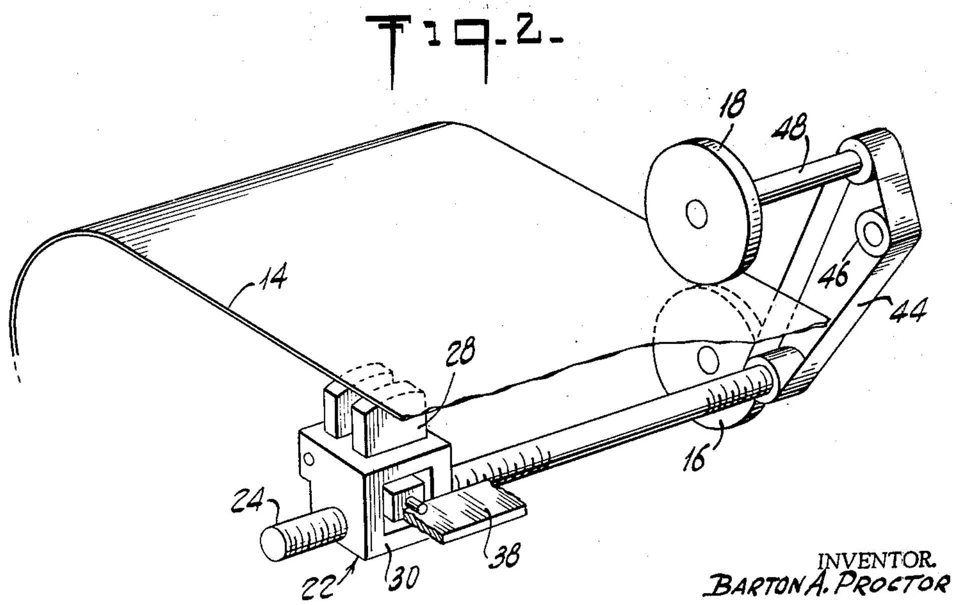
FIG. 2 is an enlarged partial perspective view of the belt drive means and the recording head traversing mechanism.
Figures 3, 4:
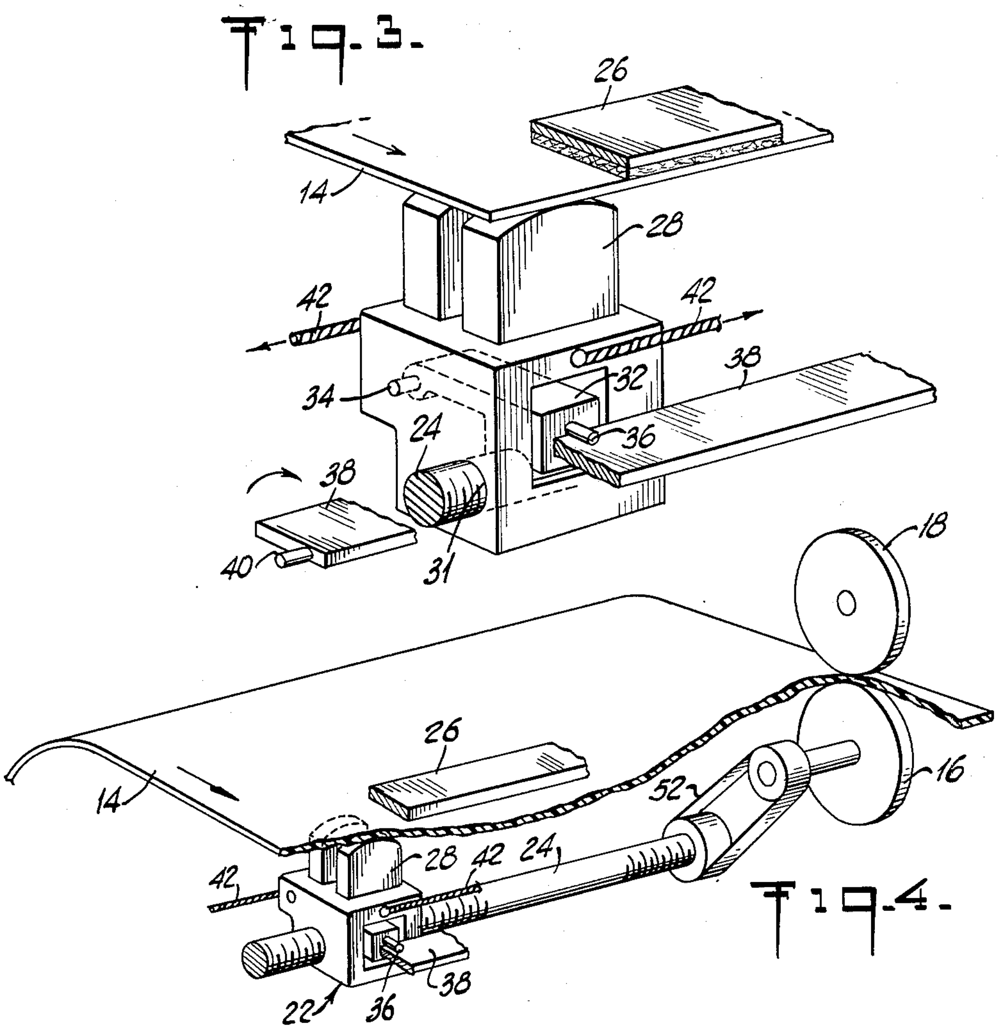
FIG. 3 is an enlarged partial perspective view showing the recording head positioning means.
FIG. 4 is a partial perspective view showing another embodiment of the invention wherein the recording head traversing mechanism is driven from the lower drive roller.

Referring to FIG. 2, the recording belt 14 is shown in contact with the lower friction drive roller 16. The drive roller 16 in the present invention corresponds to the friction wheel 25 of the aforementioned U.S. Patent No. 2,628,842. In this embodiment the friction roller 16 is continuously rotating. An idler wheel 18 is mounted above roller 16 and is capable of vertical movement downward with its shaft 48 to urge the belt 14 against the running drive wheel 16 to drive the belt, and is also positionable to a raised condition to remove the pressure on the belt and thereby stop the belt 14. Because the magnetic recording belt 14 is of the type wherein the information thereon is recorded in the form of a helical channel on the belt, it is necessary to transversely move the recording head 22 across the width of the belt as the belt rotates. This is accomplished by connecting the threaded shaft 24 to the upper idler shaft 48 through the drive belt 44. This belt arrangement is provided with a take-up idler 46 which maintains belt tension even though the upper idler wheel 18 is movable (by means not shown) in a vertical plane. The recording and reproducing head has a base portion 30 which has an unthreaded aperture 31 through which the feed shaft 24 passes. Internally mounted upon a pivot 34 within the base portion 30 is a threaded follower arm 32. This threaded follower arm has a semi-circular threaded portion held in downward engagement with the threaded portion of the lead screw 24. The follower arm 32 carries a projecting pin 36 which is controlled by a contacting pivotally supported disengaging bar 38. Whenever rapid lateral shifting or repositioning of the recording head is required the turning of a control knob 25 on the face of the machine acts to raise the bar 38 thereby lifting the half-nut threaded portion of arm 32 from the shaft 24 and at the same time pull the recording head laterally by exerting tension on a pair of horizontal carriage operating cables 42 (FIG. 3). These cables 42 and the control knob 25 may correspond respectively to the elements numbered 41 and 13 in the aforementioned prior art patent. Located above a magnetic head portion 28 of the carriage and on the other side of the recording belt therefrom is a back-up plate 26 which traverses the width of the belt. In this manner, close contact between the belt and recording head is maintained during the traversing of the carriage.

Figure 5:
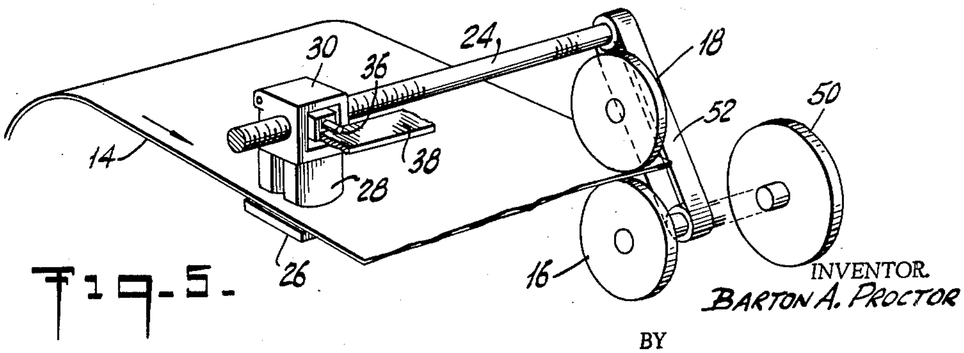
FIG. 5 is a partial perspective view of another embodiment of the invention.

In the embodiments of FIGS. 4 and 5, a similarly arranged recording head 22 is also shown upon a translating carriage assembly. These embodiments differ from the previously described embodiments in that their carriage drive is under the control of the lower drive wheel 16 rather than under the control of the upper idler roller 18.

FIG. 5 shows the location of the recording carriage outside of the recording belt, instead of the previous location within the belt enclosure. In these latter figures, it is obviously desirable to control the rotary motion of the drive wheel 16 intermittently rather than continuously to avoid the rapid traversing of the carriage across the belt width. In transistorized and battery operated portable machine where it is extremely desirous to conserve electrical current such intermittent operation of the drive roller 16 is necessary to conserve power. In FIG. 5, a fly wheel 50 is carried on the drive shaft of friction wheel 16 to impart a smooth linear speed to the recording belt. A drive belt 52 connects the pulley portion of the fly wheel shaft to a similar portion at the end of the threaded carriage shaft 24 to accomplish carriage translation in a manner identical with the previous embodiment.

From the foregoing description it can be seen how the present invention easily converts a portable sound recording and reproducing machine similar to that described in Patent 2,628,842 into an improved magnetic belt recorder. This conversion is accomplished with a minimum of complexity while maintaining the fundamental proven design of the prior art. The invention results in a modernized magnetic belt recorder of the type wherein upon belt rotation carriage translation is effected in timed relation to belt linear travel to maintain carriage alignment with the recording track upon the belt.

While specific embodiments of the invention have been shown and described in detail to illustrate the application of the invention principles, it will be understood that the invention may be embodied otherwise without departing from such principles.

What I claim is:

1. A sound recording and reproducing machine comprising a frame, a pair of spaced substantially parallel non-driven support drums mounted on said frame, a pair of opposed wheels positioned to engage opposite sides of an endless oval-shaped magnetic belt of substantial width mounted around said support drums, a threaded shaft rotatably mounted on said frame substantially parallel to said support drums, a magnetic recording carriage mounted upon said threaded shaft, drive means connected to one of said wheels and to said threaded shaft and recording carriage control means to disengage said recording carriage from said threaded shaft and to axially translate said recording carriage along the length of said threaded shaft.

2. Apparatus according to claim 1, including in addition a recording head back-up plate positioned in substantially parallel spaced relation with respect to said threaded shaft and adjacent said recording carriage.

3. A sound recording and reproducing machine comprising a frame, a pair of spaced substantially parallel non-driven support drums, a pair of guide plates at one end of each of said support drums, a pair of opposed friction wheels positioned to engage and drive an endless oval-shaped magnetic recording belt of substantial width mounted around said drums, a threaded shaft rotatably mounted on said frame between said drums, a recording carriage mounted upon said threaded shaft, a substantially semi-circular threaded portion mounted pivotally from said recording carriage, said threaded portion being in engagement with said threaded shaft, drive means connected to rotate one of said friction wheels and to rotate said threaded shaft in unison, and recording carriage control means to lift said semi-circular threaded portion out of engagement with said threaded shaft and to axially translate said recording carriage along the length of said threaded shaft.

4. A sound recording and reproducing machine comprising a frame, a pair of spaced, substantially parallel non-driven support drums, a pair of guide plates at one end of each of said support drums, a pair of opposed friction wheels positioned to engage and drive an endless oval shaped magnetic recording belt of substantial width mounted around said drums, a threaded shaft rotatably mounted on said frame between said drums, a recording carriage mounted upon and adapted to be guided solely by said threaded shaft, a substantially semi-circular threaded portion mounted pivotally from said recording carriage, said threaded portion being in engagement with said threaded shaft, drive means connected to rotate one of said friction wheels and to rotate said threaded shaft in unison, and recording carriage control means to lift said semi-circular threaded portion out of engagement with said threaded shaft and to axially translate said recording carriage along the length of said threaded shaft, and a pair of horizontally disposed control cables attached to said recording carriage.

5. A sound recording and reproducing machine comprising a frame, a pair of spaced substantially parallel non-driven support drums mounted on said frame, a pair of opposed wheels positioned to engage opposite sides of an endless oval-shaped magnetic belt of substantial width mounted around said support drums, a threaded shaft rotatably mounted on said frame between and substantially parallel to said support drums, a magnetic recording carriage mounted upon said threaded shaft, drive means connected to one of said wheels and to said threaded shaft and recording carriage control means to disengage said recording carriage from said threaded shaft and to axially translate said recording carriage along the length of said threaded shaft, the shape of said belt being substantially the same when in the machine as the shape of the belt outside the machine and not supported by said support drums.

References Cited in the file of this patent

UNITED STATES PATENTS

| | | |
|---|---|---|
| 2,371,116 | Yerkovich et al. | Mar. 6, 1945 |
| 2,535,498 | Kornei | Dec. 26, 1950 |
| 2,581,499 | Roberts | Jan. 8, 1952 |
| 2,628,842 | Moore et al. | Feb. 17, 1953 |
| 2,652,259 | Keller | Sept. 15, 1953 |
| 2,698,183 | Lang | Dec. 28, 1954 |
| 2,742,284 | Munroe | Apr. 17, 1956 |
| 2,899,506 | Wehmer | Aug. 11, 1959 |